United States Patent
Sabo et al.

(10) Patent No.: US 11,782,842 B1
(45) Date of Patent: Oct. 10, 2023

(54) TECHNIQUES FOR RECLAIMING DIRTY CACHE PAGES

(71) Applicant: Dell Products L.P., Hopkinton, MA (US)

(72) Inventors: Ami Sabo, Netanya (IL); Oran Baruch, Tel Aviv (IL); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/722,696

(22) Filed: Apr. 18, 2022

(51) Int. Cl.
*G06F 12/0891* (2016.01)
*G06F 12/02* (2006.01)

(52) U.S. Cl.
CPC ...... *G06F 12/0891* (2013.01); *G06F 12/0246* (2013.01); *G06F 2212/2022* (2013.01)

(58) Field of Classification Search
CPC ............. G06F 12/0891; G06F 12/0246; G06F 2212/2022
See application file for complete search history.

(56) References Cited

U.S. PATENT DOCUMENTS

| 7,509,461 B1* | 3/2009 | Bhayana | G06F 12/0866 |
| | | | 711/170 |
| 2019/0129859 A1* | 5/2019 | Jia | G06F 12/0868 |

OTHER PUBLICATIONS

U.S. Appl. No. 17/386,974, filed Jul. 28, 2021, entitled Memory Efficient Approach To Extending Cache, to Oran Baruch, et al.

* cited by examiner

*Primary Examiner* — Tasnima Matin
(74) *Attorney, Agent, or Firm* — Muirhead and Saturnelli, LLC

(57) ABSTRACT

In a log based system, a reclamation list of cache pages containing dirty data can be maintained and used. The cached dirty data pages identified by the reclamation list can be candidates for eviction from the cache. A cached dirty data page on the reclamation list can be persistently logged in a transaction log extension having storage allocated from a non-volatile solid state drive (SSD). The reclamation list can include descriptors of the cached dirty data pages prioritized for eviction in accordance with a least recently used (LRU) policy so that the LRU cached dirty data page can be selected for eviction. When a dirty data page which was evicted from the cache is reloaded into cache, the dirty data page can be added to the reclamation list by adding its page descriptor to the reclamation list. A dirty data page can be removed from the reclamation list once flushed.

18 Claims, 12 Drawing Sheets

US 11,782,842 B1

TECHNIQUES FOR RECLAIMING DIRTY CACHE PAGES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: receiving a write operation that writes first data to a first logical address; responsive to receiving the write operation, performing first processing that logs the write operation in a transaction log; and performing second processing to obtain a new cache page from the cache. The first processing can include: storing the first data at a first location on a non-volatile solid state drive (SSD) providing storage for an extension of the transaction log; storing, in a first cache page of a cache, the first data written by the write operation; marking the first cache page as a dirty cache page that has not been flushed to backend non-volatile storage; storing, in a metadata log, a first page descriptor for the first data, wherein the first page descriptor includes first information indicating that the first data is written to the first logical address, indicating that the first data is stored at the first location on the non-volatile SSD providing storage for the extension of the transaction log, and indicating that the first data is loaded into the first cache page of the cache; storing, in a dirty page list, the first page descriptor, wherein each page descriptor of the dirty page list identifies a data page that has not been flushed to the backend non-volatile storage; and storing, in a reclamation list, the first page descriptor, wherein each page descriptor of the reclamation list identifies a data page which is stored in the cache, has not been flushed to the backend non-volatile storage, and references dirty data stored on the non-volatile SSD providing storage for the extension of the transaction log. The second processing can include: selecting, for eviction from the cache using the reclamation list, the first data which is stored in the first cache page and which is described by the first page descriptor included in the reclamation list; removing the first page descriptor from the reclamation list; and allocating the first cache page as a free cache page available for reuse as the new cache page.

In at least one embodiment, processing can include: receiving a read operation requesting to read content stored at the first logical address; determining that content stored at the first logical address is not stored in the cache thereby resulting in a cache miss; responsive to the cache miss, performing cache miss processing using the dirty page list, said cache miss processing including: locating the first page descriptor in the dirty page list; retrieving, using the first information of the first page descriptor of the dirty page list, the first data from the first location on the non-volatile SSD providing storage for the extension of the transaction log; responsive to said retrieving, storing the first data in a second cache page of the cache; updating the first information of the first page descriptor for the first data to indicate that the first data is stored in the second cache page; adding the first page descriptor to the reclamation list; and marking the second cache page as a dirty cache page that has not been flushed to the backend non-volatile storage.

In at least one embodiment, processing can include flushing the write operation recorded in the transaction log. Flushing can include: reading, from the metadata log, the first page descriptor for the first data written to the first logical address by the write operation, wherein the first data is stored at the first location on the non-volatile SSD providing storage for the extension of the transaction log; binding the first logical address to the first location on the non-volatile SSD, wherein said binding includes updating mapping information that maps the first logical address to the first location on the non-volatile SSD; and removing the first page descriptor from the reclamation list.

In at least one embodiment, the second processing to obtain a new cache page from the cache can further include: determining that there are no free pages in the cache; and responsive to said determining that there are no free pages in the cache, searching a clean page list for a clean page of data for eviction from the cache, wherein the clean page list includes page descriptors for pages of data which are stored in the cache and which have been flushed to the backend non-volatile storage. The second processing can include determining, using the clean page list, that there are no clean pages of data in the cache. Responsive to determining that there are no clean pages in the cache, the second processing can include searching the reclamation list for a dirty cache page of data for eviction from the cache.

In at least one embodiment, searching the reclamation list can include performing said selecting, for eviction from the cache using the reclamation list, the first data which is stored in the first cache page and which is described by the first page descriptor included in the reclamation list.

In at least one embodiment, a cache page of the cache marked as free may not include valid data used to service read operations. A cache page of the cache marked as clean can include valid data used to service read operations. In at least one embodiment, the transaction log can include storage of a non-volatile random access memory (NVRAM).

In at least one embodiment, a second page descriptor can be included in the metadata log for second data written by a second write operation to a second logical address. The second page descriptor can include second information indicating that the second data is written to the second logical address, indicating that the second data is stored at a second location on the NVRAM providing storage for the transaction log, and indicating that the second data is loaded into a second cache page of the cache. The second page of the cache can be marked as dirty since the second data has not yet been flushed to the backend non-volatile storage. The second page descriptor can be included in the dirty page list. The second page descriptor may not be included in the reclamation list since the reclamation list may not include page descriptors associated with dirty data stored on the NVRAM providing storage for the transaction log. Processing can include flushing the second write operation recorded in the transaction log. Flushing can include: storing the second data from the second cache page to a physical storage location on the backend non-volatile storage; and binding the second logical address to the physical storage location on the backend non-volatile storage, wherein said binding includes updating mapping information that maps the second logical address to the physical storage location on the backend non-volatile storage.

In at least one embodiment, the reclamation list can identify cached dirty pages of data which are candidates for eviction from the cache. Each cached dirty page of data stored on a non-volatile random access memory (NVRAM) providing storage for the transaction log may not be included on the reclamation list and may not be a candidate for eviction from the cache. Each evicted cached page of dirty data stored in the extension of the log on at least one non-volatile SSD providing storage for the extension may be included on the reclamation list and may be a candidate for eviction from the cache.

In at least one embodiment, the reclamation list can be managed using a least recently used policy so that a particular data page, which has an associated page descriptor on the reclamation list and which has an oldest or earliest access time with respect to access times of all data pages with associated page descriptors on the reclamation list, may be selected for eviction from the cache prior to any other data page which has an associated descriptor on the reclamation list.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
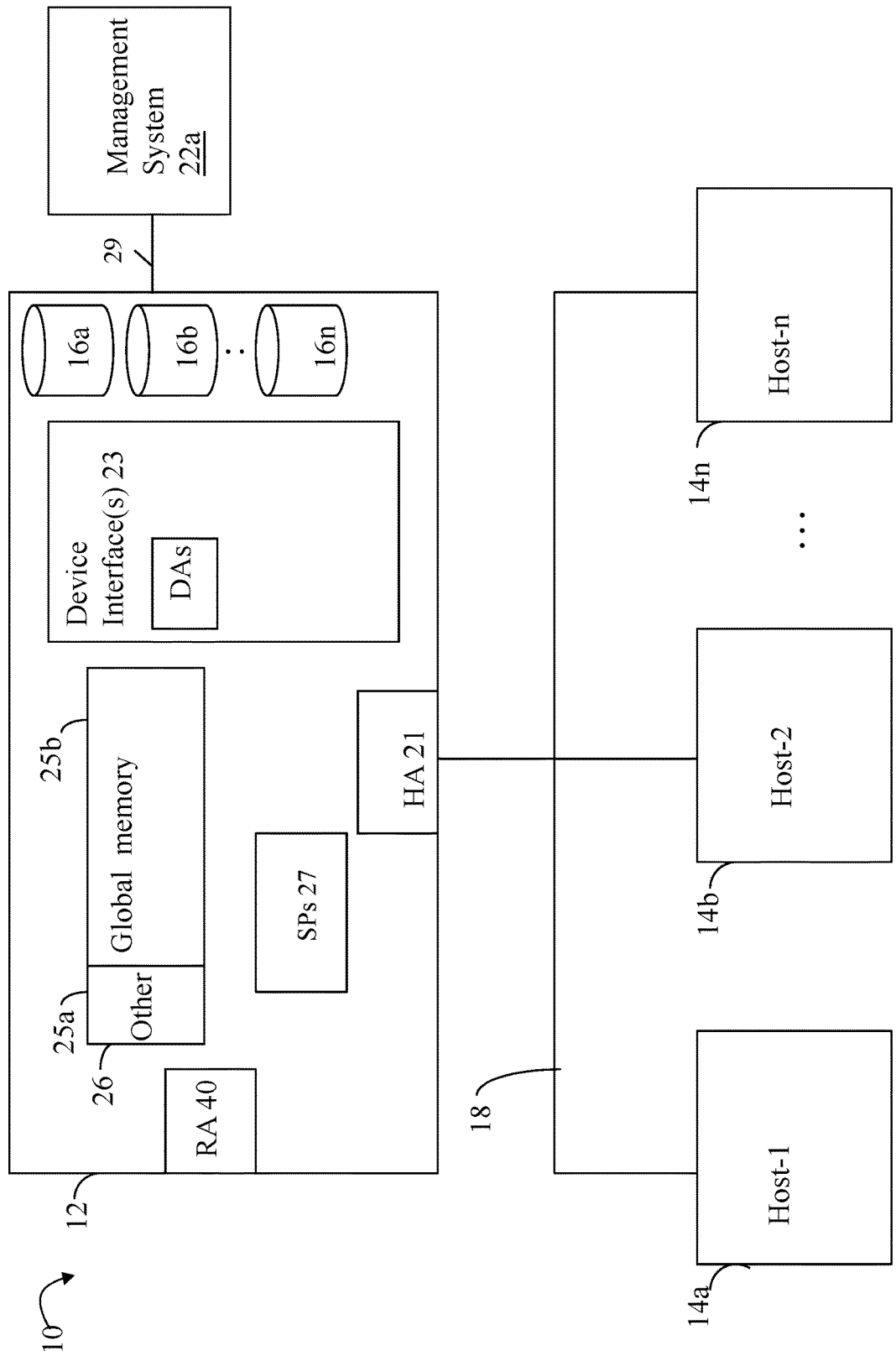
FIG. 1 is an example of components included in a system in accordance with the techniques of the present disclosure.

A data storage system, or more generally any suitable system or device, can include a cache memory or cache memory system. The cache memory can include one or more forms of fast memory to facilitate access to data thereby increasing system performance. Data stored in the cache memory can include, for example, copies of user data stored in data buffers or cache pages of the cache memory, descriptors for the cached user data, and the like. A descriptor can correspond to a single page of data and can generally have a smaller size (e.g., occupy less storage) than the single page of data. For example, the page of user data can be 4K bytes as compared to the descriptor which can be, for example, 64 bytes).

A data storage system can be a log-based or log-structured system (LSS) where writes (sometimes referred to as write requests, write operations or write I/O operations) can be recorded in a persistently stored log (sometimes also referred to as a transaction log). At some subsequent point in time after recording the write in a record of the log, the record for the write can be flushed from the log. Flushing the record of a write operation can include storing the content written by the write operation at a storage location on a backend (BE) non-volatile storage device (PD). The write operation can store write data at a logical address. The logical address can denote a logical device and a logical offset or block address (LBA) on the logical device. Additionally, flushing can include updating mapping information for the logical device where the mapping information maps or binds the logical address to the storage location on the BE PD. Thus, in an LSS system, content that is written by a logged or recorded write operation can be temporarily persisted in the log and then flushed from the log to the BE PDs.

In at least one data storage system, the transaction log including the write data or content and associated descriptors can be persistently stored on non-volatile random access memory (NVRAM). A system which uses only the NVRAM for the transaction log can undesirably be limiting. As such, without further expanding the amount of NVRAM used for the transaction log, an improvement can be to expand or extend the transaction log to utilize other available non-volatile storage having sufficiently fast data access characteristics. For example, the transaction log can be extended to utilize the NVRAM and also non-volatile solid state storage devices (SSDs). The SSDs can be characterized in one aspect as a transaction log extension which can be used, for example, when the NVRAM is at or near a maximum level of capacity consumption or bandwidth. In such a system, portions of the SSDs used as the transaction log extension can be dynamically allocated as may be needed by the transaction log depending on the consumption or utilization of the NVRAM for the transaction log. When the SSDs, or portions thereof, are not needed or used as the transaction log extension, the SSDs or portions thereof can be alternatively used as BE PD storage. In this manner the SSDs can be repurposed or reallocated dynamically as may be needed for multiple non-volatile storage uses. The transaction log extension can be considered as part of the transaction log or the overall aggregated storage used for the transaction log.

In such a system using the NVRAM for the transaction log and further extended transaction log using the SSDs, an increased amount of write data and other information (e.g., descriptors) can be stored in the collective transaction log and extension as compared to just using the NVRAM for the transaction log. For pages of data persistently stored in the transaction log and extension, it may also be desirable to store the data in cache. As a result of the increased size of the transaction log and extension, and thus an increased amount of data stored in the transaction log with its extension on the SSDs, the amount of cache consumed to store the logged dirty data (e.g., unflushed modified data) and associated information such as descriptors can also increase.

To overcome the foregoing limitations and drawbacks, described in the following paragraphs are techniques of the present disclosure that can be used to keep a reduced amount of information in cache memory for logged dirty pages which have not yet been flushed while storing the data pages in persisted storage such as in the transaction log extension configured from storage of the SSDs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22*a* to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22*a* to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
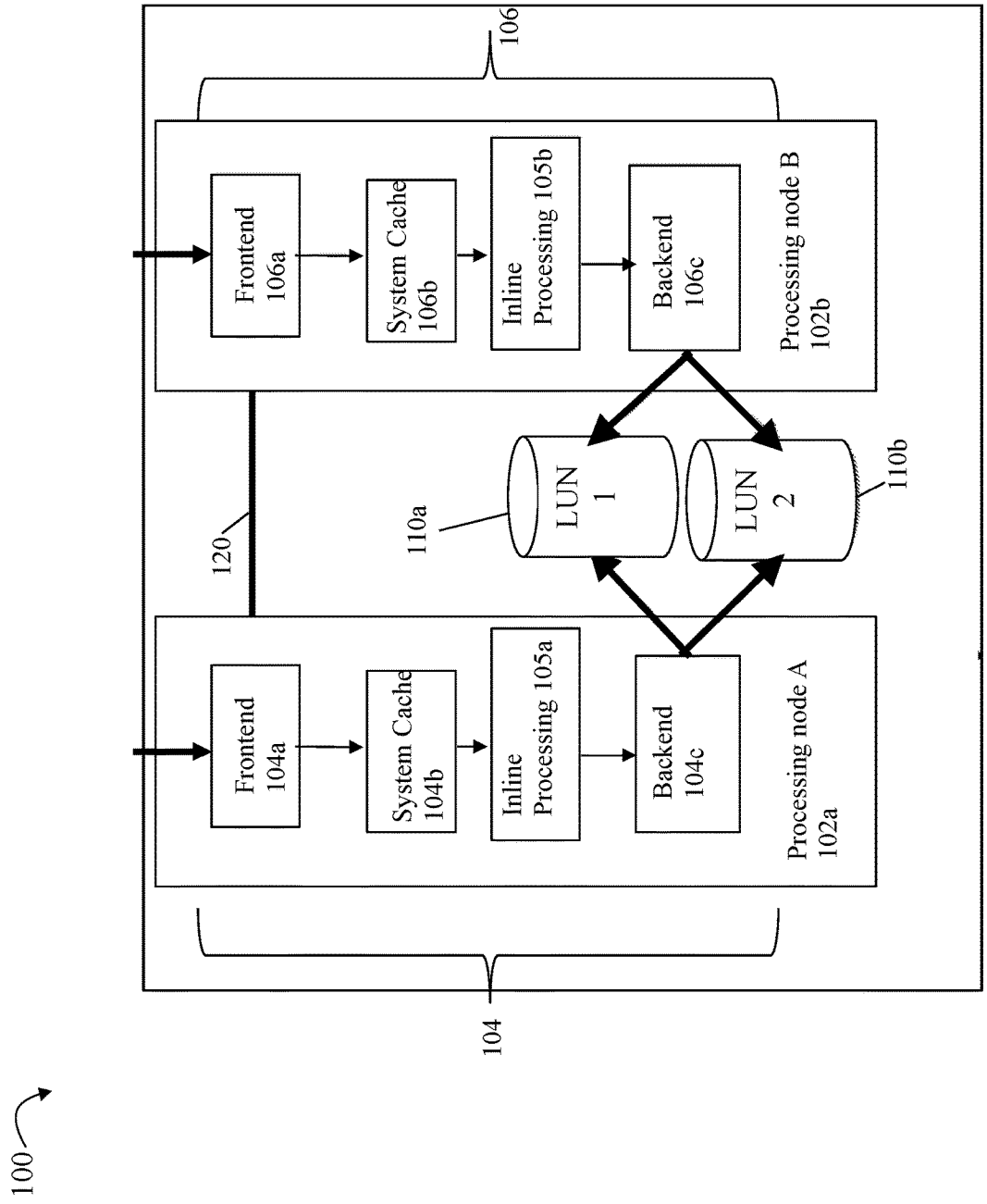
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102*a* and B 102*b* and the associated software stacks 104, 106 of the data path, where I/O requests can be received by either processing node 102*a* or 102*b*. In the example 100, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and BE component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes directed to the LUNs 110*a*, 110*b* can be received for processing by either of the nodes 102*a* and 102*b*, the example 100 illustrates what is also referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache (e.g., cache hit or read cache hit), the read data block is retrieved from the system cache 104b and returned to the host. Otherwise, if the requested read data block is not in the system cache 104b (e.g., cache miss or read cache miss) but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
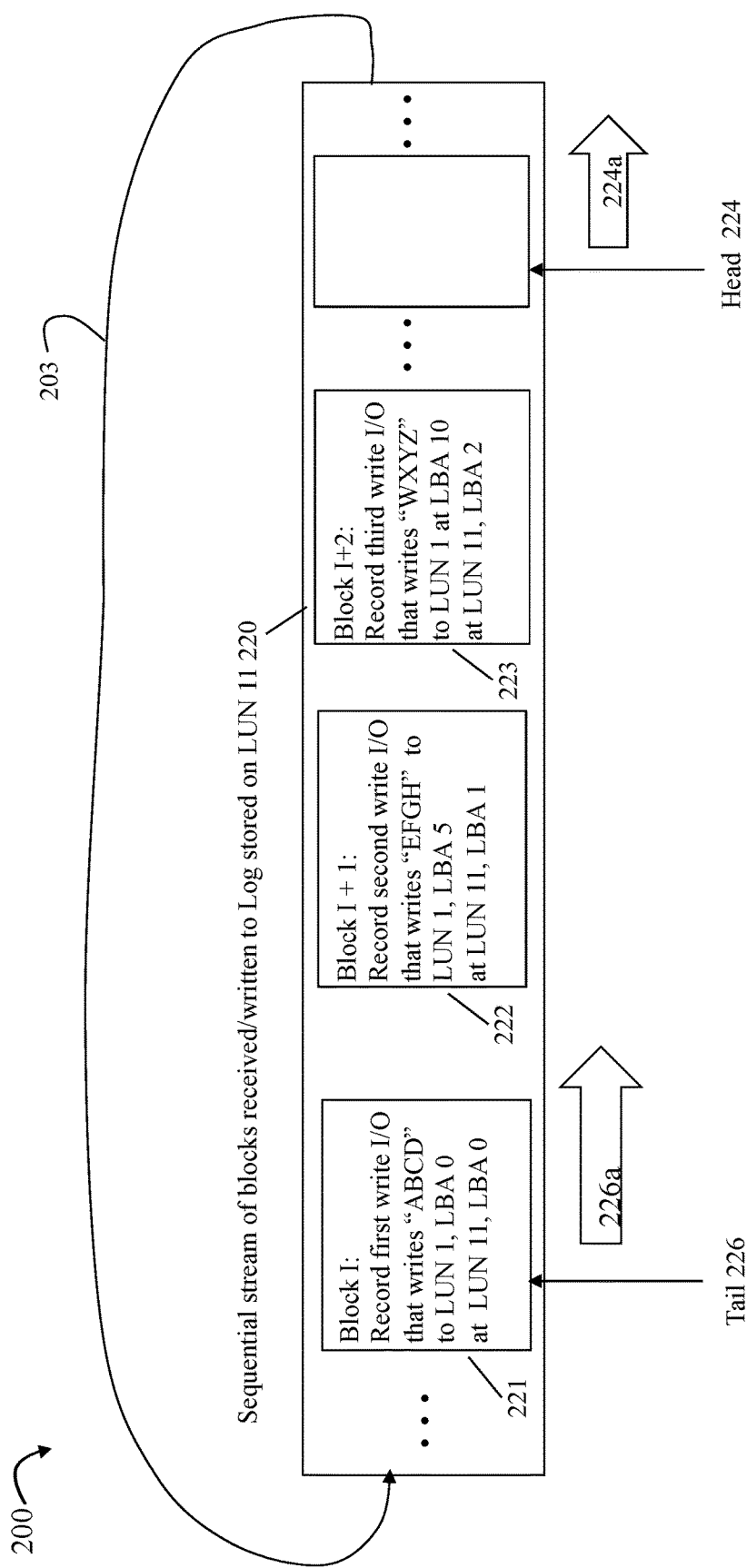
FIGS. 3, 4, 5 and 6 are examples illustrating use of a log structured system in at least one embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write i/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
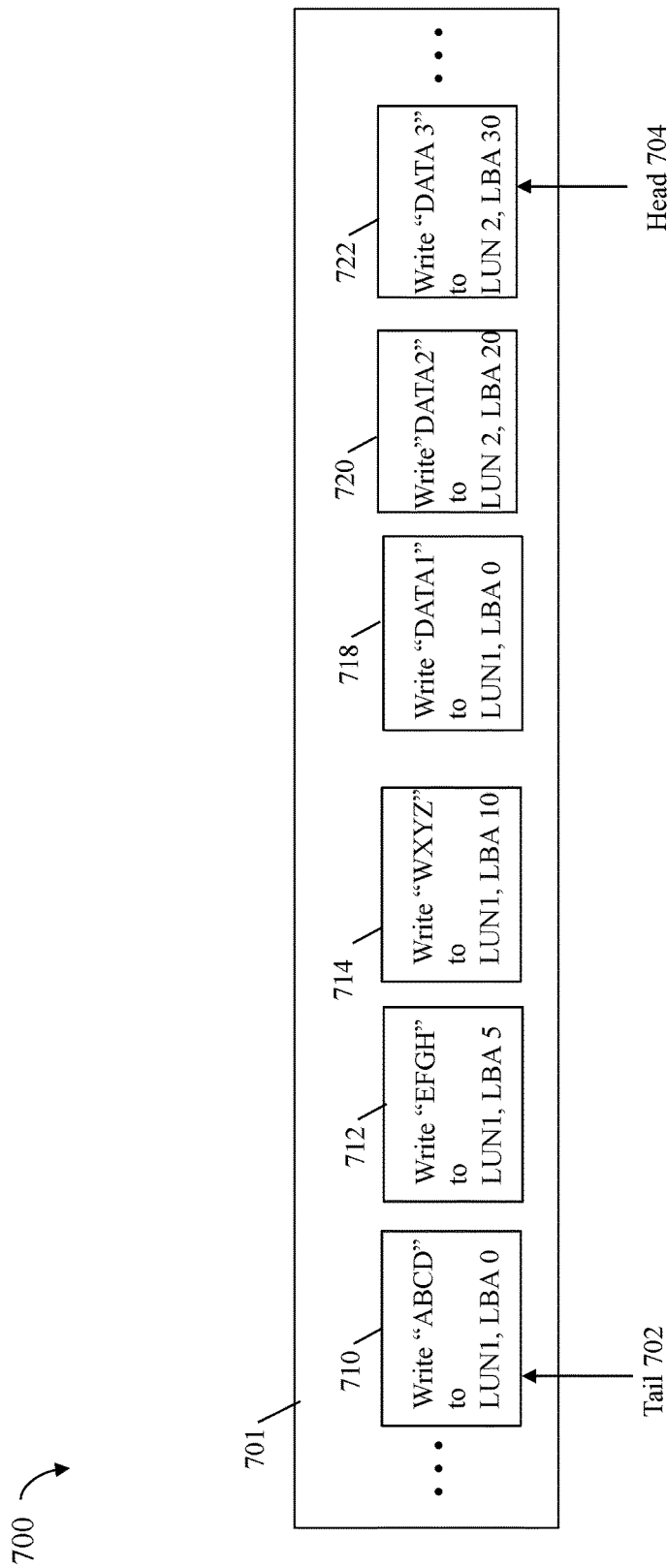

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
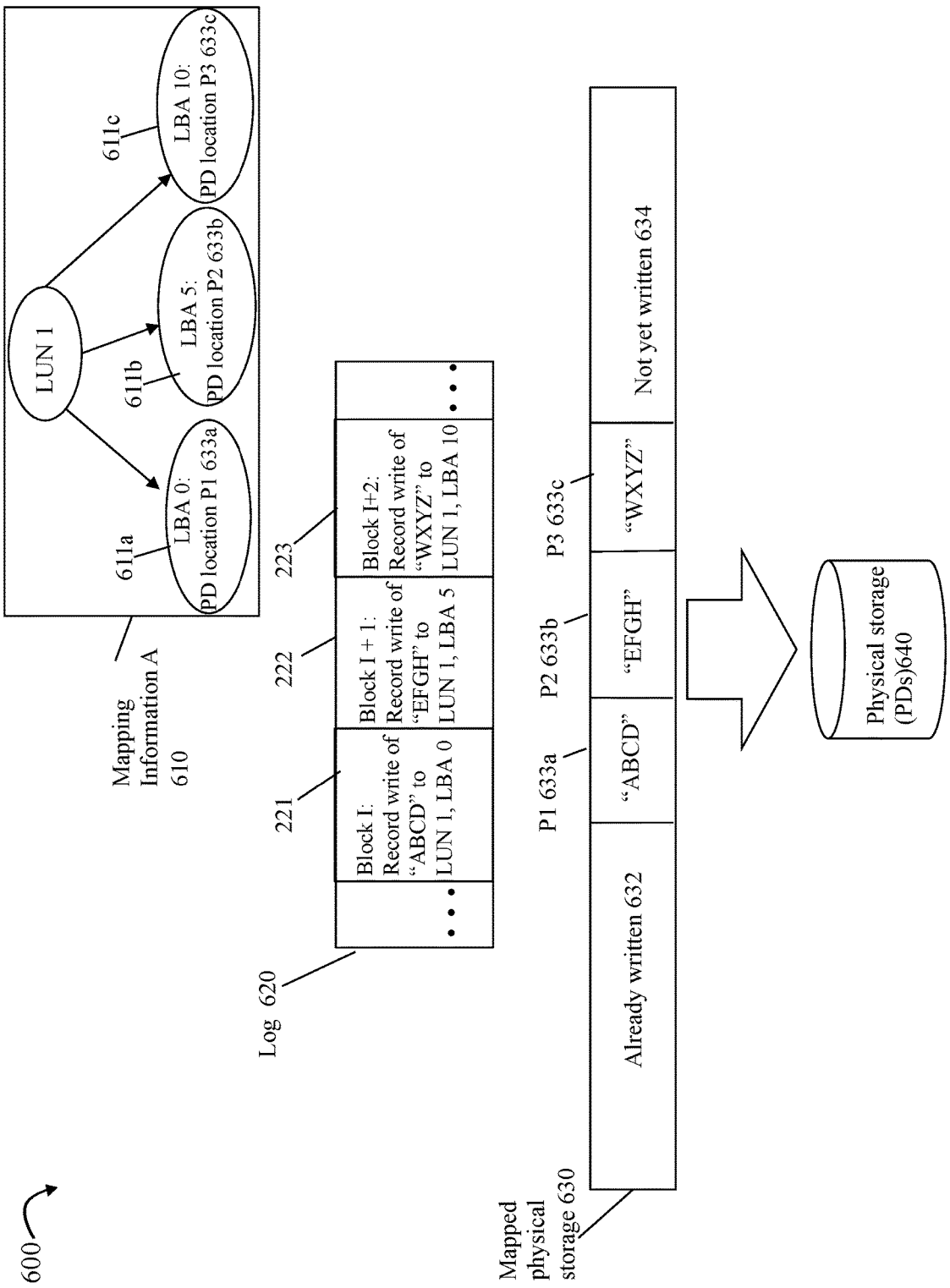

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs. As a recorded write operation that writes write data to a particular logical address, such as a LUN and LBA, is flushed from an entry of the log 620, mapping information that maps the particular logical address to the physical storage location including the write data or content stored at the particular logical address can be accordingly updated.

Figure 6:
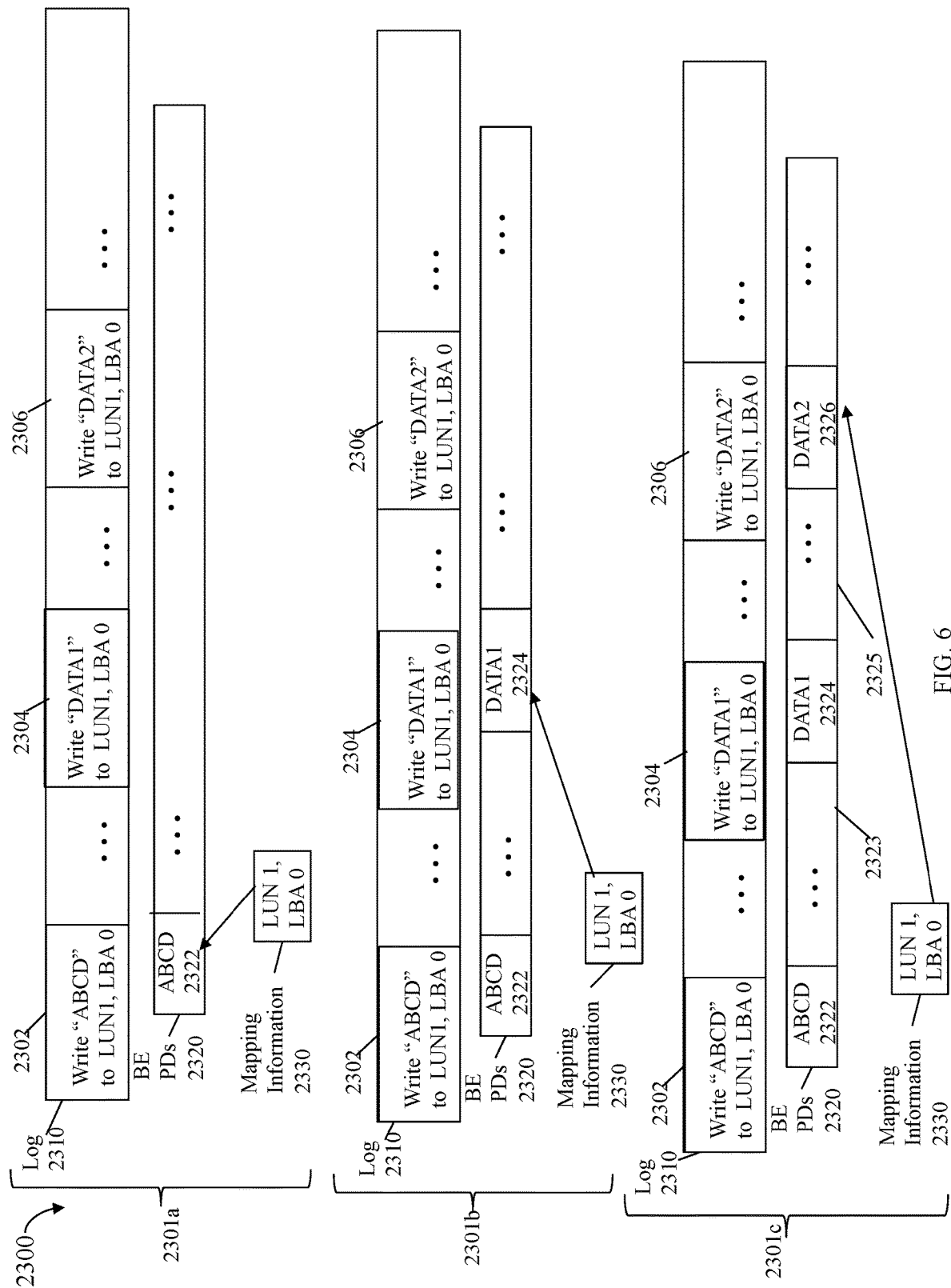

For example with reference to FIG. 6, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 320. The element 301b denotes the state of the log file 2310, BE PDs 2320 and mapping information 2330 at the second point in time T2 after processing the record 2304 for a second write of "DATA1" to the logical address LUN A, LBA 0. The data written "DATA1" by the recorded write of 2304 can be stored at the BE PD location 3224. Thus, flushing the log record 2304 results in storing the write data "DATA1" to the BE PD location 2324 and additionally updating the mapping information 2330 to reference the BE PD location 2324 denoting the physical location containing the data stored at the LUN 1, LBA 0 at the time T2. Additionally, the PD location 2322 can be invalidated since it no longer contains valid current data for the logical address LUN 1, LBA 0, whereby the PD location 2322 can be available for reuse. After the log record 2304 is flushed from the log 2310, the record 2304 is available and can be subsequently reclaimed for reuse for logging other operations in the log 2310.

At a third point in time T3 subsequent to T2, the log record 2306 can be processed and flushed to the BE PDs 2320. The element 2301c denotes the state of the log file 2310, BE PDs 2320 and mapping information 330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

It should be noted that the flushing of the log can be performed in response to an occurrence of any one or more defined conditions. For example, the log can be flushed in response to determining that the amount of reclaimed log space available for use and allocation is less than a specified threshold amount or size.

Consistent with discussion above, the mapping information (sometimes referred to as a mapping structure, metadata structure or simply metadata (MD)) can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location on the BE PDs containing the content or data stored at the logical address. In at least one embodiment, the mapping information includes a MD structure that is hierarchical structure of multiple layers of MD pages or blocks.

In at least one embodiment, the mapping information or structure for a LUN, such as LUN 1 described above in connection with FIGS. 3, 4, 5 and 6, can be in the form of a tree having a plurality of levels of MD pages. More generally, the mapping structure can be in the form of any ordered list or hierarchical structure. In at least one embodiment, the mapping structure for a LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes.

In at least one embodiment, each BE I/O operation to read data from, or write data to, a BE PD can go through cache. The cache can be a volatile memory cache, for example, of a processing node of the data storage system. In such an embodiment, any data read from a BE PD results in retrieving the requested read data and storing the read data in the cache. In such an embodiment, any data written to a BE PD can be performed by storing the write data in the cache, and then storing the cached copy of the write data on the BE PD.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure. In at least one embodiment, content recorded persistently in the log can also be stored in volatile memory cache of each node. When write data is flushed by a node, it can be flushed from the log and the volatile memory cache of the node. In at least one embodiment, write data marked as "dirty" can remain in the volatile memory cache of the node while the write data is in the log and has not yet been flushed from the log to a BE PD (providing non-volatile storage). Once the dirty cached data has been flushed to the BE PD, the dirty cached data can be reclassified or remarked as "clean".

A data storage system, or more generally any suitable system or device, can include a cache memory or cache memory system. The cache memory can include one or more forms of fast memory to facilitate access to data thereby increasing system performance. Data stored in the cache memory can include, for example, copies of user data stored in data buffers or cache pages of the cache memory, descriptors for the cached user data, and the like. A descriptor can correspond to a single page of data and can generally have a smaller size (e.g., occupy less storage) than the single page of data. For example, the page of user data can be 4K bytes as compared to the descriptor which can be, for example, 64 bytes).

As discussed above, a data storage system can be a log-based or log-structured system where writes (sometimes referred to as write requests, write operations or write I/O operations) can be recorded in a persistently stored log (sometimes also referred to as a transaction log). At some subsequent point in time after recording the write in a record of the log, the record for the write can be flushed from the log. Flushing the record of a write operation can include storing the content written by the write operation at a storage location on a backend (BE) non-volatile storage device (PD). The write operation can store write data at a logical address. The logical address can denote a logical device and a logical offset or block address (LBA) on the logical device. Additionally, flushing can include updating mapping information for the logical device where the mapping information maps or binds the logical address to the storage location on the BE PD. Thus, in an LSS system, content that is written by a logged or recorded write operation can be temporarily persisted in the log and then flushed from the log to the BE PDs.

In at least one data storage system, the transaction log including the write data or content and associated descriptors can be persistently stored on NVRAM. A system which uses only the NVRAM for the transaction log can undesirably be limiting. As such, without further expanding the amount of NVRAM used for the transaction log, an improvement can be to expand or extend the transaction log to utilize other available non-volatile storage having sufficiently fast data access characteristics. For example, the transaction log can be extended to utilize the NVRAM and also non-volatile SSDs. The SSDs can be characterized in one aspect as a transaction log extension which can be used, for example, when the NVRAM is at or near a maximum level of capacity consumption or bandwidth. In such a system, portions of the SSDs used as the transaction log extension can be dynamically allocated as may be needed by the transaction log depending on the consumption or utilization of the NVRAM for the transaction log. When the SSDs, or portions thereof, are not needed or used as the transaction log extension, the SSDs or portions thereof can be alternatively used as BE PD storage. In this manner the SSDs can be repurposed or reallocated dynamically as may be needed for multiple non-volatile storage uses. The transaction log extension can be considered as part of the transaction log or the overall aggregated storage used for the transaction log.

In such a system using the NVRAM for the transaction log and further extended transaction log using the SSDs, an increased amount of write data and other information (e.g., descriptors) can be stored in the collective transaction log and extension as compared to just using the NVRAM for the transaction log. For pages of data persistently stored in the transaction log and extension, it may also be desirable to store the data in cache. As a result of the increased size of the transaction log and extension, and thus an increased amount of data stored in the transaction log with its extension on the SSDs, the amount of cache consumed to store the logged dirty data (e.g., unflushed modified data) and associated information such as descriptors can also increase.

To overcome the foregoing limitations and drawbacks, described in the following paragraphs are techniques of the present disclosure that can be used to keep a reduced amount of information in cache memory for logged dirty pages which have not yet been flushed while storing the data pages in persisted storage such as in the transaction log extension configured from storage of the SSDs.

In the following paragraphs, the log described above as stored persistently on non-volatile storage can also be referred to as a transaction log or Tx Log. The cache used in connection with the transaction log or Tx Log can be referred to herein as Tx Cache. The Tx Log can be more generally described in the following paragraphs as including an extension (sometimes referred to as the log extension or Tx Log extension). In at least one embodiment, the Tx Cache can be volatile memory.

In at least one embodiment, data written to the BE PDs can be copied from cache whereby, when flushing the write data from the transaction log when the write data is stored on the NVRAM, the cached copy of the write data can be flushed from the cache to the BE PDs. Generally, consistent with other discussion herein, data can be written to and read from a BE PD utilizing a cache or caching layer. BE read operations read data from the BE PDs and store the read data in the cache, and BE write operations write data from the cache to the BE PDs.

In at least one embodiment, if logged data or modified content is stored in the NVRAM of the transaction log, it can be necessary to also have the modified content stored in the cache memory in order to flush the logged data to the BE PDs. However, in at least one embodiment, if the logged data or modified content is stored on a non-volatile SSD included in the extension of the transaction log, the logged data or modified content does not have to pass through the cache in order to be stored on the BE PDs. In at least one embodiment, the modified content or logged data can be stored at a current location on the non-volatile SSD as part of the transaction log extension. Flushing the modified content or logged data from the extension can include converting, repurposing or reusing the current non-volatile SSD location from its current use as the log extension to another use as a BE PD location. In this case, the modified content or logged data being flushed does not have to reside in cache. Rather, the mapping information can be updated to map or bind the BE PD location (which is the current non-volatile SSD location storing the logged data) to its associated logical address. In this manner in at least one embodiment, the logged data stored at the current non-volatile SSD location does not have to be relocated or copied to the cache as part of flushing. Rather in such an embodiment, the current non-volatile SSD location containing the logged data can be bound or mapped to a corresponding logical address at which the logged data is stored.

In at least one embodiment, the cache memory can include one or more forms of fast volatile memory and/or non-volatile memory. In at least one embodiment, a data storage system's cache can include volatile solid state memory, such as dynamic RAM. In such an embodiment, the cache can be effectively extended to also include non-volatile SSDs by storing descriptors in the dynamic RAM which reference other descriptors and/or data stored on the non-volatile SSDs.

In at least one embodiment in accordance with the techniques of the present disclosure, the following steps can be performed and included in processing performed responsive to receiving a request to allocate or obtain a new cache page for use. For example, the request for the new cache page can be made responsive to receiving a write operation where the new cache page can be used to store the write data (as dirty data) written by the write operation. In at least one embodiment, processing performed to allocate the new cache page can include performing processing described below in the steps S1, S2, S3, S4 and S5. At the step S1, a request for a new cache page can be received, for example to store newly written content of a write I/O operation. After the step S1, the step S2 can be performed where the system can first attempt to allocate needed cache page(s) from free cache pages. A free cache page can be one that does not contain and valid data and is available for allocation or use. If the step S2 does not result in successfully allocating the desired number of cache pages, then the step S3 can be performed to select one or more clean cached data pages for eviction from the cache.

In the step S3 processing can determine if there are clean pages in cache which have been flushed to the BE PDs. Thus a clean page stored in cache includes valid data or content which can be a current or most update to date copy of the data which is also stored on the BE PDs. In this case, although clean pages include valid data and can be used, for example, to service read requests, clean cache pages can be candidates for eviction from the cache since the data is also persistently stored on the BE PDs as indicated by associated mapping information. If such a clean page, which includes content stored at a logical address, is evicted from the cache, a subsequent read request to read content stored at the logical address can result in a cache miss. In response to the cache miss, the mapping information can be used to reload the data page of the read request from the BE PDs to the cache, and then service the read using the cached copy of the data page.

If the step S3 does not result in successfully allocating the desired number of cache pages, then the step S4 can be performed in accordance with the techniques of the present disclosure to attempt to reclaim dirty cache pages of data included on the reclamation list. The reclamation list can be generally characterized as an early reclamation list of cache pages of dirty data which are candidates for eviction from the cache in the step S4. Each cache page of dirty data included on the reclamation list can be stored in persistent storage configured for the transaction log extension. In at least one embodiment, one or more non-volatile SSDs can be configured to provide storage for the transaction log extension. Dirty data included in a cache page of the reclamation list can thus be stored at a physical storage location on the one or more SSDs providing storage for the transaction log extension. In at least one embodiment, dirty pages of cached data which are logged or recorded in the non-extended portion of the transaction log, such as on NVRAM storage, are not candidates for eviction from the cache and are not included in the reclamation list.

If the step S4 does not result in successfully allocating the desired number of cache pages, then the step S5 can be performed to force flush one or more dirty pages of modified content (write data) from the log so that their associated cache pages can be reclaimed and used to store new data. Once the dirty data cache page of modified content is flushed, the cache page status changes from dirty to clean and can now be reclaimed for use.

In at least one embodiment in accordance with the techniques of the present disclosure, the number of pages that can be logged may be larger than the number of pages that can be stored at the same time in the cache memory before flushing. In at least one embodiment, the techniques of the present disclosure can result in a system logging more pages than NVRAM and cache can hold, where the NVRAM can be used for the transaction log.

In at least one embodiment in accordance with the techniques of the present disclosure, pages of data that are frequently and/or recently accessed can be stored in the in-memory data buffer of the cache and can remain in the cache in accordance with a cache management policy, such as least recently used (LRU). Use of such a cache management policy can provide for increased cache hits such as in connection with read requests for the cached data.

In at least one embodiment in accordance with the techniques of the present disclosure, cached pages of data that are not frequently accessed and/or have not been recently accessed can be evicted from cache and their cache pages reclaimed for reuse even if the cached pages contain dirty data (e.g., have not yet been flushed from the log).

In at least one embodiment in accordance with the techniques of the present disclosure, dirty pages that have been evicted from cache can be reloaded from the log as may be needed, for example, responsive to a cache miss for a read request for such a dirty page that has been evicted from cache.

In at least one embodiment in accordance with the techniques of the present disclosure, cache pages containing data can be reclaimed for use before they are cleaned or flushed from the log while providing an LRU policy in connection with prioritizing such dirty cached pages for reclamation and reuse.

In at least one embodiment, the present disclosure provides efficient flexible techniques that can be used with various platforms and configurations having various types and sizes of cache memory.

In at least one embodiment, to facilitate cache miss processing for cache evicted dirty pages, a pointer or reference can be stored in the cache, where the pointer or reference is to a physical storage location (persistent) of the evicted dirty data page in the log. In such an embodiment, the evicted dirty pages can be stored on one or more non-volatile SSD configured as the extension of the transaction log. If flushing of the cache evicted dirty page stored on the non-volatile SSD used as the log extension occurs prior to a subsequent read cache miss for the cache evicted dirty page, the cache evicted dirty page can be flushed from the log extension by binding the evicted dirty page's current physical location on the non-volatile SSD (configured as the log extension) to a corresponding logical address. In this manner in such an embodiment, flushing of the evicted dirty page from the non-volatile SSD used as the log extension can be accomplished by the foregoing binding without having the dirty page being flushed pass through (e.g., be reloaded to) the cache, or more generally, the caching layer.

In at least one embodiment, the techniques of the present disclosure provide for efficiently paging out or evicting older dirty pages of data from cache with minimal impact to performance. Such evicted dirty pages of data can be stored in the log extension configured from physical storage locations on non-volatile SSDs, where such non-volatile SSD physical storage locations can be bound and reconfigured for use as non-volatile BE storage (e.g., BE PDs).

In at least one embodiment in accordance with the present disclosure, a dirty page of data can be deemed irrelevant for reclamation processing if the dirty page of data has already been evicted or paged out of cache (where the dirty data is therefore not currently stored in cache), or if the dirty page of data is stored in cache and has been recently used. If a first dirty data page is stored in cache and has been deemed recently used, there can be other cached dirty data pages having a most recent or last reference time which is prior to the last time or most recent time the first data page was referenced. In this case in an embodiment applying an LRU eviction policy, it can be expected that the first dirty cache page last accessed at time T1 is more likely to be referenced or accessed again with subsequent I/O operations than other dirty cached pages having a last or most recent access time prior to T1. Based on the LRU policy, the dirty cached pages with the most recent access times can be retained in the cache longer the other dirty cached pages having earlier associated access times.

In at least one embodiment, the techniques of the present disclosure can be used to efficiently select dirty pages of cached data for eviction from the cache. In at least one embodiment, an LRU (least recently used) approach or policy can be applied to select and prioritize the cached dirty pages for eviction or paging out of the cache.

In at least one embodiment in accordance with the techniques of the presented disclosure, multiple lists of cache pages can be maintained and utilized. The multiple lists can include a free page list identifying free cache pages, a dirty page list of cache pages containing dirty data, and the reclamation list of cache pages containing dirty data which is persistently stored in non-volatile storage of the transaction log extension.

In at least one embodiment in accordance with the techniques of the present disclosure, dirty cached pages can be selected as candidates for eviction from the cache after one or more other techniques have failed to generate the one or more cache pages needed for allocation. In at least one embodiment where a new cache page is needed such as for storing new logged write data, a system can perform processing that first attempts to satisfy the allocation request using a free cache page. A cache page can be designated as free, for example, if it does not contain valid data and is currently marked as free and available for reuse. If there are no free pages in the cache, processing can attempt to satisfy the allocation request using a clean cache page including data that is valid and has been flushed. If there are no clean cache pages, processing can attempt to satisfy the allocation request using a dirty cached page that has been journaled or logged in the log extension on the SSDs used for the log extension. In at least one embodiment, the dirty cached page stored in the SSD log extension can also be stored in the cache. The processing can include selecting a dirty page for cache eviction where the dirty page is currently stored in the cache and also stored on the SSD of the log extension. The processing can reclaim and thus free a particular cache page storing the dirty page of data by retaining in the cache a pointer to the SSD extended log location containing the dirty data and then reclaiming the particular cache page storing the dirty data. The reclaimed cache page (storing the evicted dirty data located on the SSD extended log) can be marked as free or available for use and then used to satisfy the request for the new cache page. In at least one embodiment, forced or on-demand flushing of entries from the log can be performed as a last option when other techniques (such as all the above-noted techniques and processing) have failed to obtain a cache page for reuse and allocation to satisfy the request for the new cache page.

In at least one embodiment in accordance with the techniques of the present disclosure, a reference, pointer, or address, as saved in the cache, can denote the address of the SSD extended log location containing the dirty data. The pointer saved in the cache by prior reclamation processing can be used, for example, in response to a subsequent read cache miss for the dirty data where the pointer can be used to reload the dirty data from the SSD extended log location to the cache and then the cached dirty data can be used to service the read that caused the read cache miss.

The foregoing and other aspects of the techniques of the present disclosure are described in more detail in the following paragraphs.

In at least one embodiment in accordance with the techniques of the present disclosure, the data storage system can be a log based system as discussed above which record writes in the transaction log. The transaction log can include a non-extended portion and an extension or extended portion. The non-extended portion can be configured from NVRAM storage and the extension or extended portion can be configured from one or more non-volatile SSDs. In at least one embodiment, write data can be record in the transaction log and also stored in the cache. Subsequently, the write data can be flushed from the log to the BE PDs.

In such systems in at least one embodiment, data written to the BE PDs can be copied from cache whereby, when flushing the write data from the log, the cached copy of the write data can be flushed from the cache to the BE PDs. Generally, consistent with other discussion herein, data can be written to and read from a BE PD utilizing a cache or caching layer. BE read operations read data from the BE PDs and store the read data in the cache, and BE write operations write data from the cache to the BE PDs. For logged or recorded write data persistently stored in the extension configured from the SSDs, flushing the write data can be accomplished by binding the current storage location of the SSD storing the write data to its associated logical address (e.g., the write data is stored as content at the associated logical address). Thus in at least one embodiment, where flushing the write data logged or recorded on the SSD providing storage for the transaction log extension is done by the foregoing binding, the write data does not pass through the cache or caching layer. In contrast in such an embodiment where second write data is stored in the non-extended portion of the transaction log on NVRAM, flushing the second write data can require that the second write data be stored in the cache, and then copied from the cache to a storage location on a BE PD.

Figure 7:
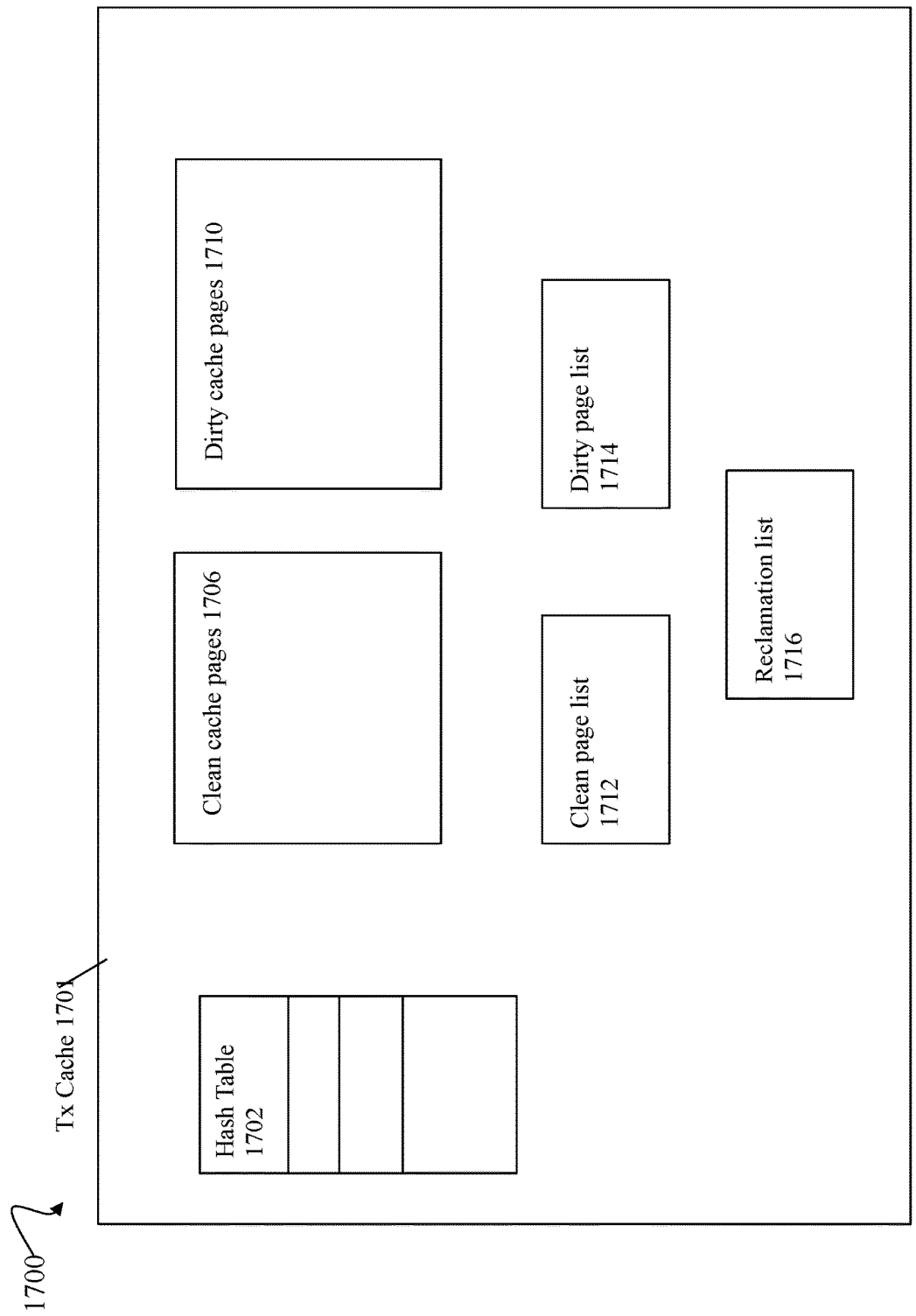
FIG. 7 is an example of illustrating a transaction log cache in at least one embodiment in accordance with the techniques of the present disclosure.

Referring to FIG. 7, shown is an example 1700 of a cache memory system 1701 that can be used in at least one embodiment in accordance with the techniques of the present disclosure. The cache memory system 1701 illustrated can be of a single node or CPU (e.g., such as a single one of the processing nodes 102a-b of FIG. 2) in the data storage system. Examples of memory which can be included in the cache memory system 1701 may include but are not limited to a volatile, solid-state, cache memory system (e.g., a dynamic RAM cache memory system) and/or a non-volatile, solid-state, cache memory system (e.g., a flash-based, cache memory system). During operation of a CPU or processing node such as the node 102a or 102b of FIG. 2, a write operation writing content can be received and stored at least initially in the cache memory system 1701. In at least one embodiment, the Tx Cache 1701 can be implemented using volatile memory so that all the elements illustrated in FIG. 7 can be stored in volatile memory.

The cache system 1701 denote the Tx Cache or portion of the cache used in connection with the transaction log (including its extension) in at least one embodiment. The Tx Cache 1710 can include a hash table 1702, clean cache pages 1706, dirty cache pages, the clean page list 1712 of clean cache pages, the dirty page list 1714 of cache pages of dirty data or content, and the reclamation list 1716. The dirty cache pages 1710 can represent the portion of cache pages which are dirty storing dirty data or content of a logical address that has not yet been flushed to a storage location on a BE PD. The indication of dirty denotes content that has not yet been flushed and is therefore a current valid version of the content stored at the logical address. Content or a cache page marked as dirty indicates that existing content stored on the BE PDs for the logical address is invalid or out of data in that the cached dirty content is the most recent up to date content of the logical address. The clean cache pages 1706 can represent the portion of cache pages which are clean and include valid content or data. Cached content or a cache page containing content marked as clean indicates that the content is clean and has been flushed to a BE PD storage location mapped to the logical address. The clean page of data (denoting content storage at a particular logical address) can be retained in the cache for subsequent use in servicing I/O operations such as, for example, read operations requesting to read data stored at the particular logical address.

The clean page list 1712 can include clean pages of data organized in a list data structure. The dirty pages list 1714 can include dirty pages of data organized as a list data structure. The reclamation list 1716 can include dirty cache pages of data from 1710 where such dirty logged data is also persistently recorded or stored in the transaction log extension rather than the non-extended portion of the transaction log. In at least one embodiment, one or more SSDs (e.g., 806 of FIG. 8) can be the physical storage configured for the transaction log extension, and the NVRAM (e.g., 804 of FIG. 8) can be the physical storage configured for the non-extended portion of the transaction log. Thus, in such an embodiment, each cache page included in the reclamation list 1716 can include dirty cached content that is logged or recorded persistently in physical storage on at least one of the one or more SSDs providing storage for the transaction log extension (e.g., the extended portion of the transaction log, where the one or more SSDs are denoted as 806 of FIG. 8). In such an embodiment, the dirty page list 1714 can include the same pages of dirty cached data as the reclamation list as well as other pages containing dirty cached content that is logged or recorded persistently in physical storage on the NVRAM providing storage for the transaction log (e.g., the non-extended portion of the transaction log). In at least one embodiment, the dirty page list 1714 can also include dirty pages of content stored on the SSD of the extension, where such dirty pages have been evicted from the cache and also not yet been flushed, and where such evicted dirty pages were previously stored on the reclamation list and have had their cache pages reclaimed using the reclamation list.

In at least one embodiment, the clean page list 1712, the dirty pages list 1714 and the reclamation list 1716 can be implemented as linked lists of page descriptors where each of the page descriptors can reference a corresponding or associated single page of data. A page descriptor used herein can generally include information describing the associated page of data. The page descriptor for data can include information such as, for example, the logical address (e.g., LUN or volume and LBA) where the data is stored, a reference (e.g., pointer or address) to a cache page including the data, a reference to a persistent storage location in the transaction log where the data is logged or recorded (e.g., where the persistent storage location can be in the NVRAM providing storage for the non-extended portion of the transaction log, or an SSD providing storage for the extension), and other information some of which is described herein. Thus, the page descriptor can include references used to retrieve corresponding data described by the page descriptor, where the corresponding data can be stored in the transaction log and can also be stored in the cache.

In at least one embodiment, the clean page list 1712, the dirty pages list 1714 and the reclamation list 1716 can be implemented as linked lists having entries which are page descriptors of pages of data organized in accordance with the an LRU policy. Each of the lists 712 714 and 716 can have a head and a tail, where entries can be added to the tail of the list and entries can be removed from the head of the list. In such an embodiment based on the LRU policy, the page descriptors can be arranged so that the most recently used page represented by a descriptor on the list is at the tail of the list and the least recently used page is represented by a page descriptor at the head of the list. Based on the LRU policy, cached data pages each represented by a page descriptor can have an associated time stamp indicating the last or most recent time that the data page representing content stored at particular logical address is accessed. Thus each time content of the cached data page is referenced such as due to a cache hit, the cached data page can be repositioned at the tail of the list. In accordance with the LRU policy in at least one embodiment, the cached data pages within each single one of the lists 1712, 1714 and 1716 can be prioritized for eviction based on sorted time stamp order (e.g., oldest time stamped cached data page at the head of the list, and the most recent time stamped cached data page at the tail of the list) so that the oldest or least recently accessed data page can be evicted from the cache prior to other data pages having a more recent time stamp (e.g., more recently accessed).

In at least one embodiment, page descriptors on the clean page list 1712 may each correspond to a clean cached page of data. In at least one embodiment, page descriptors of the reclamation list 1716 each can correspond to a cached page of dirty data also persistently recorded in the log extension (e.g., SSD 806 of FIG. 8). In at least one embodiment, page descriptors of the dirty page list 1714 can include cached dirty pages and also pages of data which have been evicted from cache (e.g., dirty pages stored on the reclamation list were previously cached and had their cache pages reclaimed using the reclamation list) where such cached evicted dirty pages of data are logged in the transaction log extension.

In at least one embodiment, entries or page descriptors for dirty cached data pages can be added to the reclamation list 1716 when the cache page becomes dirty storing dirt cached content located on an SSD providing storage for the transaction log extension, or when reloading a previously evicted dirty page from an SSD providing storage for the transaction log extension.

In at least one embodiment, entries or page descriptors for dirty cached pages can be removed from the reclamation list 1716 when the page has been flushed (so it is no longer dirty), and when a dirty cached page of the reclamation list is evicted and reclaimed such as on demand, or more generally, in response to the occurrence of one or more trigger events or other processing described herein.

In at least one embodiment, pages from the reclamation list 1716 can be reclaimed after it has been determined that sufficient cache pages cannot be reclaimed from the clean page list 1712. In at least one embodiment where the lists 1712, 1714 and 1716 are linked lists of page descriptors, a data page having its cache page reclaimed from the reclamation list 1716 can have its page descriptor removed from the list 1716. However, the page descriptor removed from the list 1716 can remain on the dirty page list 1714. In at least one embodiment, processing performed in response to a cache miss can traverse the dirty page list 1714 to locate a page descriptor of an evicted dirty page in order to use the page descriptor to reload the associated evicted dirty page back into cache such as, for example, to service the cache miss. For example, the cache miss can be caused by a read operation to read content stored at a logical address where the evicted dirty page is the content stored at the logical address.

The hash table 1702 can include page descriptors for cached data pages stored in the Tx Cache 1701. In at least one embodiment, the hash table 1702 can be organized for access using a logical address as the key which can be mapped to a page descriptor referencing a cache page descriptor. In at least one embodiment, for a given logical address, the hash table 1702 can return the cache page descriptor of the cache page containing the content stored at the logical address. The cache page descriptor can be used to access the cache page containing the content storage at the logical address. The hash table can alternatively be used to obtain the page descriptor mapped to the logical address. In turn, the returned page descriptor can generally include information used to access the cache page containing the associated content as well as other information some of which is described herein.

Figure 8:
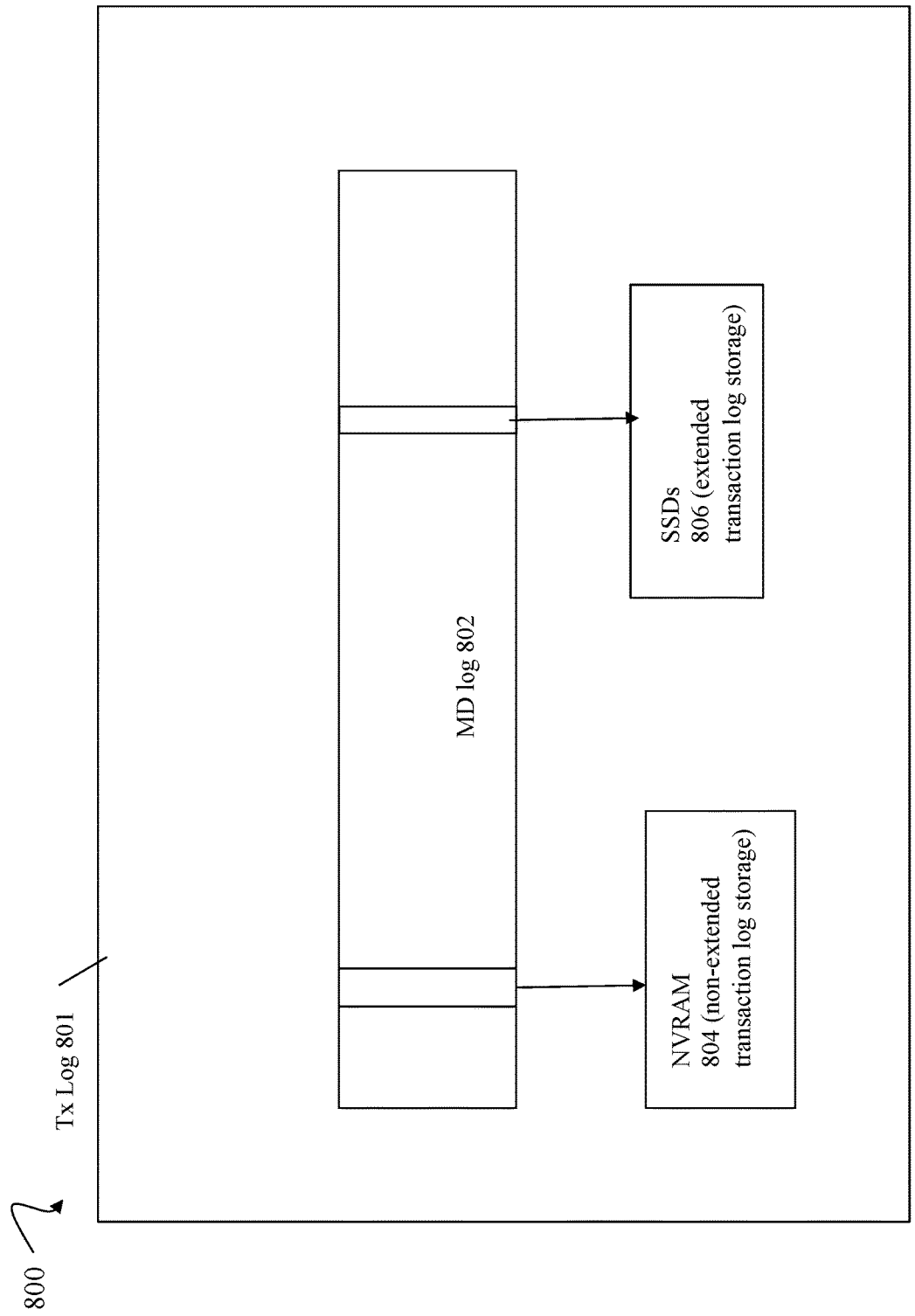
FIG. 8 is an example illustrating a transaction log in at least one embodiment in accordance with the techniques of the present disclosure.

Referring to FIG. 8, shown is an example 800 of a log system used by a data storage system in at least one embodiment in accordance with the techniques of the present disclosure. The example 800 illustrates structures and storage that can be used in connection with the log system. Generally the Tx Log 801 corresponds to persistent storage. The Tx Log 801 uses the MD log 802 to manage persistent storage in the NVRAM 804 and the non-volatile SSDs 806. In at least one embodiment, the NVRAM 804 can provide storage for logging or recording content of the non-extended transaction log portion, and the SSDs 806 can provide storage for logging or recording content of the extended transaction log or transaction log extension. In at least one embodiment, the NVRAM 804 can store pages of data in buffers and the SSDs 806 can store data in physical layer blocks or PLBs. In at least one embodiment, the SSDs 806 can denote SSDs of a storage tier, where the SSDs 806 can be configured for providing logging storage for the transaction log extension rather BE non-volatile storage.

The Tx log 801 includes page descriptors of data stored on the NVRAM 804 and the SSDs 806. In at least one embodiment, the page descriptors can be included in the MD log 802 and arranged in a ring configuration. The storage system can create and store in the MD log 802 a page descriptor for each page of the data logged or recorded in the transaction log. In some embodiments, each page descriptor of the MD log 802 includes the location of the data on the NVRAM 804 or SSD 806 and the checksum of the data.

Generally, an embodiment can use any suitable criteria to decide whether to record or log data in the NVRAM 804 or the SSDs 806 providing storage for the transaction log extension. For example, in at least one embodiment, the size of the data being logged can be evaluated to determine whether the size exceeds a threshold size. If so, the data can be logged or recorded persistently in the SSDs 806. Otherwise, if the size does not exceed the threshold size, the data can be logged or recorded in the NVRAM 804. In at least one embodiment, each data buffer of the NVRAM 804 can be a specified size so that the threshold size can be the data buffer specified size. In at least one embodiment, larger sized writes may be more easily stored in PLB units on the SSDs.

In at least one embodiment when the storage system receives a write operation or request, the system can determine the size of the content written and whether to record or log the written content on the NVRAM 804 or SSDs 806 as just described. Additionally, for every page of data stored on the NVRAM 804 and SSDs 806, a page descriptor can be created and stored in the MD log 802. When the page descriptor for logged content written to a logical address is created and stored in the MD log 802, processing can also update the hash table 1702 to map the logical address to the created page descriptor.

In at least one embodiment, when the storage system receives a read operation or request to read content stored at a logical address, the hash table 1702 can be used to retrieve the requested content using the page descriptor mapped to, and associated with, the logical address. In at least one embodiment, the page descriptor describing an associated data page can include the logical address where the associated data page is stored, the persistent storage location where the associated data page is located (e.g., either an SSD location in the extension or an NVRAM location if not in the log extension), a flag indicating whether the associated data page is stored in cache, and a reference to a cache page descriptor used to access the cache location of the associated data page.

In at least one embodiment, a cache page stored on the reclamation list can be removed, reclaimed and made free and available for reuse in response to an occurrence of any one or more defined trigger conditions or criteria.

The defined trigger conditions or criteria can include performing reclamation processing and reclaiming one or more cache pages from the reclamation list on demand or in response to a request to allocate a new cache page. In at least one embodiment, a cache page of the reclamation list can be reclaimed and made available for reuse as a free cache page as part of processing performed to allocate a new cache page in response to a request or on demand such as, for example, in response to a write operation.

The defined trigger conditions or criteria can include performing reclamation processing and reclaiming one or more cache pages from the reclamation list in response to the number of cache pages on the reclamation list exceeding a specified threshold. In at least one embodiment, a counter can be maintained for the reclamation list indicating the number of cache pages of data having associated descriptors on the reclamation list. If the counter exceeds a specified threshold, processing can be performed to reclaim and thus make free and available for reuse one or more cache pages on the reclamation list. In at least one embodiment, the number of cache pages reclaimed can depend on the current counter value and the threshold. For example, the number of cache pages reclaimed from the reclamation list can reduce the number of cache pages on the list by an amount which does not exceed the threshold. In at least one embodiment, the threshold can be based on a percentage of the cache used for storing dirty pages of data which are also logged or recorded in the transaction log extension.

The defined trigger conditions or criteria can include performing reclamation processing and reclaiming one or more cache pages from the reclamation list in response to the amount of free or available cache or the amount of free or available volatile memory falling below a minimum threshold.

The defined trigger conditions or criteria can include performing reclamation processing and reclaiming one or more cache pages from the reclamation list in response to the number of free cache pages such as included on the clean page list falling below a minimum threshold.

In at least one embodiment, reclamation processing that reclaims one or more cache pages from the reclamation list can be performed asynchronously and independently of whether a new cache page is currently needed to fulfill a pending allocation request such as, for example, for storing new write data.

In at least one embodiment, reclamation processing that reclaims one or more cache pages from the reclamation list can be performed as a background process, for example, at time of low system utilization and/or low system workload.

In at least one embodiment, a reclamation list can be maintained per CPU core.

What will now be described in connection with FIGS. 9, 10, 11 and 12 are flowcharts of processing steps that can be performed in at least one embodiment in accordance with the techniques of the present disclosure.

Figure 9:
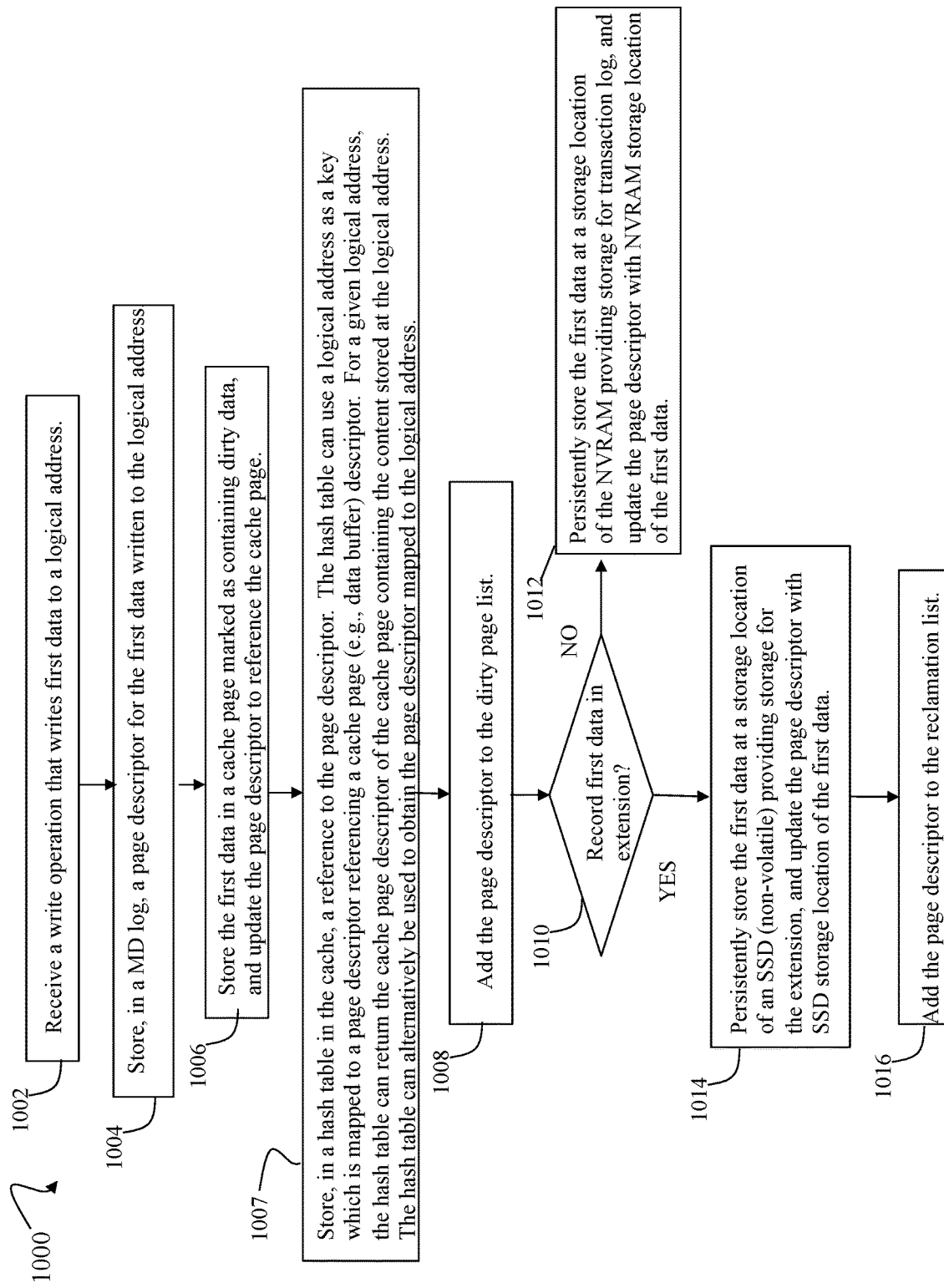
FIGS. 9, 10, 11 and 12 are flowcharts of processing steps that can be performed in at least one embodiment in accordance with the techniques of the present disclosure.

Referring to FIG. 9, shown is a flowchart 1000 of processing steps that can be performed in connection with processing a write operation in at least one embodiment in accordance with the techniques of the present disclosure.

At the step 1002, a write operation can be received at the data storage system. The write operation can write first data to a logical address. From the step 1002, control proceeds to the step 1004.

At the step 1004, processing can be performed to store, in a MD log, a page descriptor for the first data written to the logical address. From the step 1004, control proceeds to the step 1006.

At the step 1006, processing can be performed to store the first data in a cache page marked as containing dirty data, and to update the pages descriptor to reference the cache page containing the first data. From the step 1006, control proceeds to the step 1008.

At the step 1008, processing can be performed to store, in a hash table in the cache, a reference to the page descriptor. The hash table can use a logical address as a key which is mapped to a page descriptor referencing a cache page (e.g., data buffer) descriptor. For a given logical address, the hash table can return the cache page descriptor of the cache page containing the content stored at the logical address. The hash table can alternatively be used to obtain the page descriptor mapped to the logical address. From the step 1008, control proceeds to the step 1010.

At the step 1010, a determination can be made as to whether to record the first data in the transaction log extension. If the step 1010, evaluates to no, control proceeds to the step 1012. At the step 1012, processing can be performed to persistently store the first data at a storage location of the NVRAM providing storage for transaction log (e.g. non-extended log storage), and update the page descriptor with NVRAM storage location of the first data.

If the step 1010 evaluates to yes, control proceeds to the step 1014. At the step 1014, processing can be performed to persistently store the first data at a storage location of an SSD (non-volatile) providing storage for the extension, and update the page descriptor with SSD storage location of the first data. From the step 1014, control proceeds to the step 1016. At the step 1016, the page descriptor for the first data written to the logical address can be added to the reclamation list.

Figure 10:
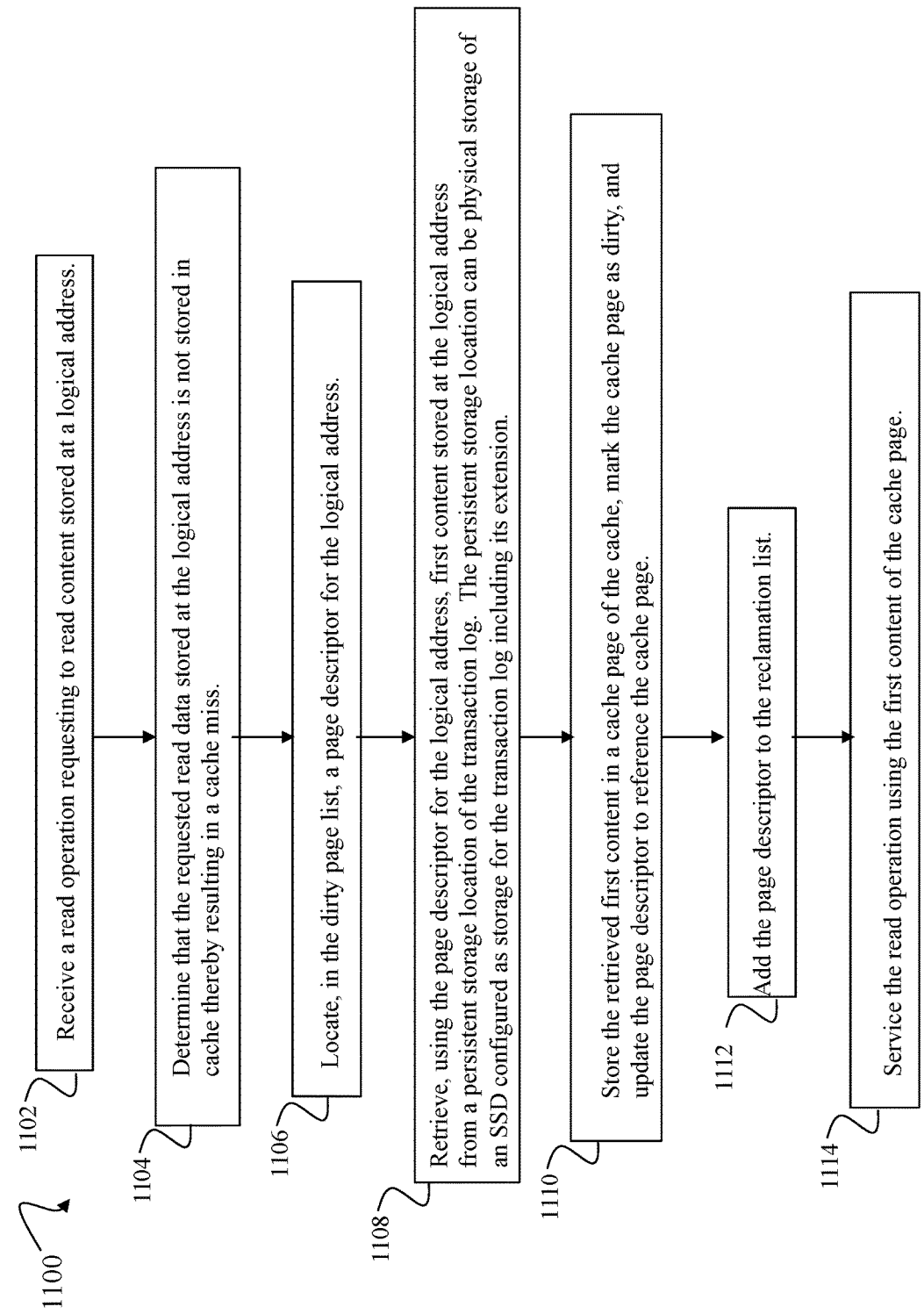

Referring to FIG. 10, shown is another flowchart 1100 of processing steps that can be performed in at least one embodiment in accordance with the techniques of the present disclosure. The flowchart 1100 steps can be performed as part of cache miss processing such as in connection with a read cache miss to read content of a dirty cache page that has been evicted from cache.

At the step 1102, an I/O operation such as a read operation can be received The read operation can request to read content stored at a logical address. From the step 1102, control proceeds to the step 1104.

At the step 1104, processing can be performed to determine that the requested read data stored at the logical address is not in cache thereby resulting in a cache miss. From the step 1104, control proceeds to the step 1106.

At the step 1106, processing can be performed to locate, in the first page list, a page descriptor for the logical address. From the step 1106, control proceeds to the step 1108.

At the step 1108, processing can be performed to retrieve, using the page descriptor for the logical address, first content stored at the logical address from a persistent storage location of the transaction log. The persistent storage location can be physical storage of an SSD configured as storage for the transaction log including its extension. From the step 1108, control proceeds to the step 1110. At the step 1110, processing can store the retrieved first content in a cache page of the cache, mark the cache page as dirty, and update the page descriptor to reference the cache page.

From the step 1110, control proceeds to the step 1112. At the step 1112, the page descriptor can be added to the reclamation list. From the step 1112, control proceeds to the step 1114.

At the step 1114, the read operation can be serviced using the first content of the cache page.

Figure 11:
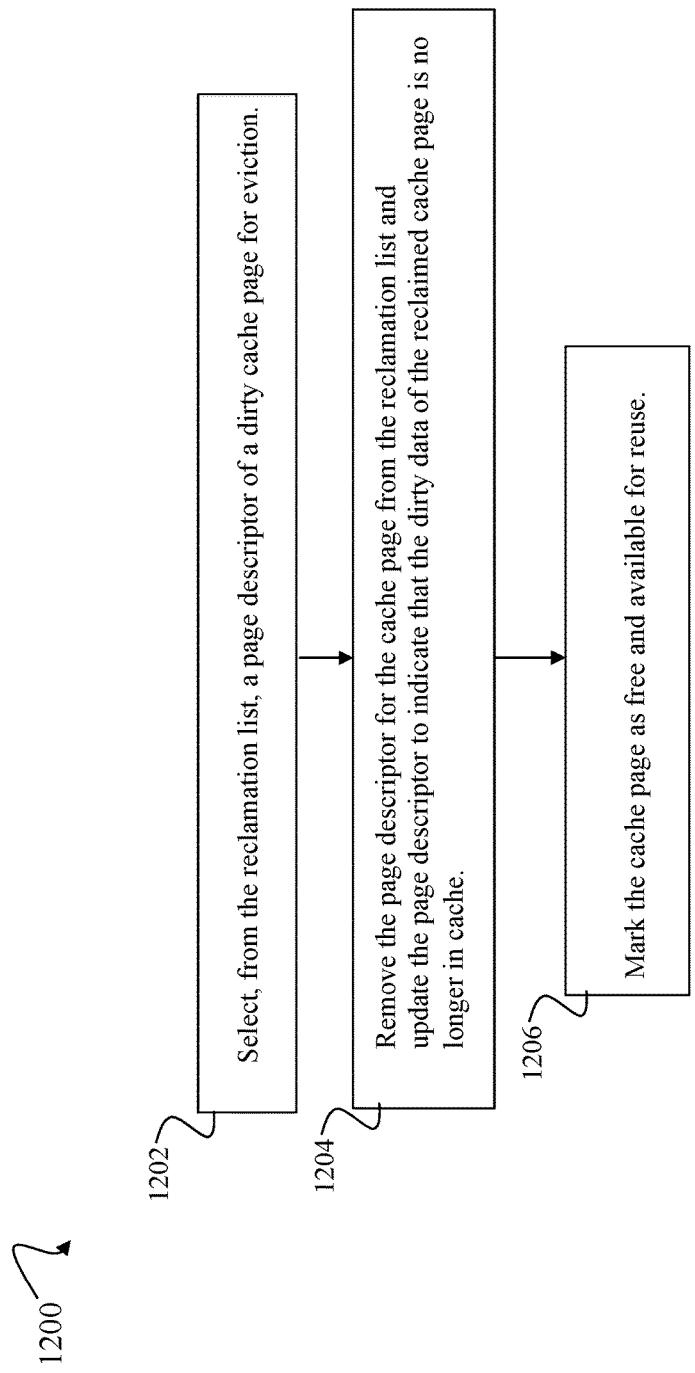

Referring to FIG. 11, shown is another flowchart 1200 of processing steps that can be performed in at least one embodiment in accordance with the techniques of the present disclosure. The flowchart 1200 steps can be performed as part of processing to free and reclaim cache pages for reuse.

At the step 1202, processing can select, from the reclamation list, a page descriptor of a dirty cache page for eviction from the cache. From the step 1202, control proceeds to the step 1204.

At the step 1204, processing can remove the page descriptor for the cache page from the reclamation list and update the page descriptor to indicate that the dirty data of the reclaimed cache page is no longer in cache. From the step 1204, control proceeds to the step 1206.

At the step 1206, processing can mark the cache page as free and available for reuse.

Figure 12:
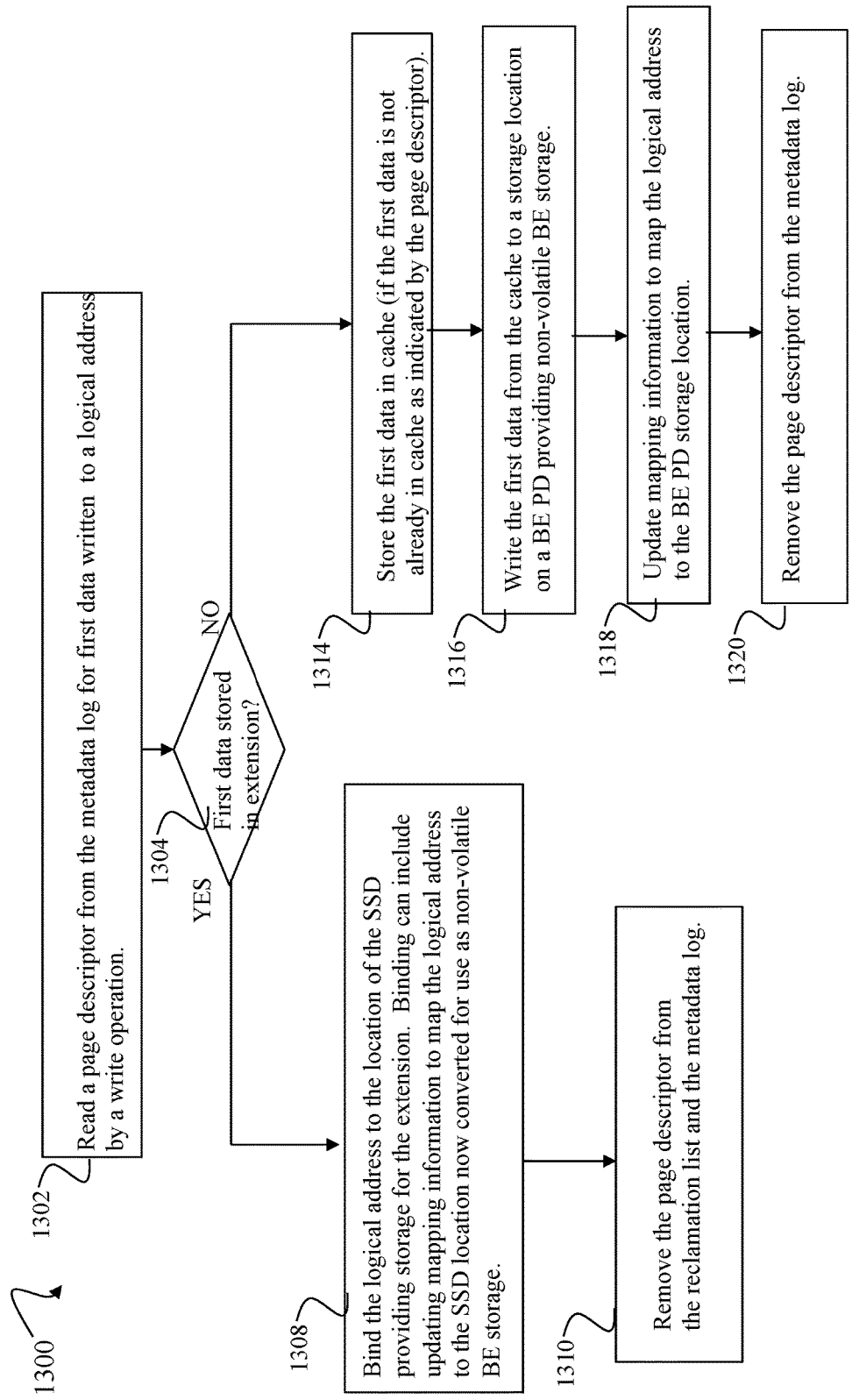

Referring to FIG. 12, shown is another flowchart 1300 of processing steps that can be performed in at least one embodiment in accordance with the techniques of the present disclosure. The flowchart 1300 steps can be performed as part of processing to flush written content for a logged or recorded write operation to the BE PDs.

At the step 1302, a page descriptor can be read from the metadata log for first data written to a logical address by a write operation logged in the transaction log. From the step 1302, control proceeds to the step 1304.

At the step 1304, a determination can be made as to whether the first data is recorded or logged in the transaction log extension on an SSD. If the step 1304 evaluates to yes, the first data is stored in the extension at a storage location on an SSD providing storage for the extension. If the step 1304 evaluates to yes, control proceeds to the step 1308.

At the step 1308, processing can bind the logical address to the storage location of the SSD providing storage for the extension, where the storage location contains the first data. Binding can include updating mapping information to map the logical address to the SSD location now converted for use as non-volatile BE storage. From the step 1308, control proceeds to the step 1310.

At the step 1310, processing can remove the page descriptor from the reclamation list and the metadata log.

If the step 1304 evaluates to no, the first data is stored in the transaction log at a location on the NVRAM providing storage for the non-extended portion of the transaction log. If the step 1304 evaluates to no, control proceeds to the step 1314.

At the step 1314, processing can store the first data in cache (if the first data is not already in cache as indicated by the page descriptor). From the step 1314, control proceeds to the step 1316.

At the step 1316, processing can write the first data from the cache to a storage location on a BE PD providing non-volatile BE storage. From the step 1316, control proceeds to the step 1318.

At the step 1318, processing can update mapping information to map the logical address to the BE PD storage location (determined in the step 1316). From the step 1318, control proceeds to the step 1320.

At the step 1320, the page descriptor for the first data can be removed from the metadata log.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
 receiving a write operation that writes first data to a first logical address;
 responsive to receiving the write operation, performing first processing that logs the write operation in a transaction log, the first processing including:
  storing the first data at a first location on a non-volatile solid state drive (SSD) providing storage for an extension of the transaction log;
  storing, in a first cache page of a cache, the first data written by the write operation;
  marking the first cache page as a dirty cache page that has not been flushed to backend non-volatile storage;
  storing, in a metadata log, a first page descriptor for the first data, wherein the first page descriptor includes first information indicating that the first data is written to the first logical address, indicating that the first data is stored at the first location on the non-volatile SSD providing storage for the extension of the transaction log, and indicating that the first data is loaded into the first cache page of the cache;
  storing, in a dirty page list, the first page descriptor, wherein each page descriptor of the dirty page list identifies a data page that has not been flushed to the backend non-volatile storage; and
  storing, in a reclamation list, the first page descriptor, wherein each page descriptor of the reclamation list identifies a data page which is stored in the cache, has not been flushed to the backend non-volatile storage, and references dirty data stored on the non-volatile SSD providing storage for the extension of the transaction log; and performing second processing to obtain a new cache page from the cache, the second processing including:
selecting, for eviction from the cache using the reclamation list, the first data which is stored in the first cache page and which is described by the first page descriptor included in the reclamation list;
removing the first page descriptor from the reclamation list; and
allocating the first cache page as a free cache page available for reuse as the new cache page.

2. The computer-implemented method of claim 1, further comprising:
receiving a read operation requesting to read content stored at the first logical address;
determining that content stored at the first logical address is not stored in the cache thereby resulting in a cache miss; and
responsive to the cache miss, performing cache miss processing using the dirty page list, said cache miss processing including:
locating the first page descriptor in the dirty page list;
retrieving, using the first information of the first page descriptor of the dirty page list, the first data from the first location on the non-volatile SSD providing storage for the extension of the transaction log;
responsive to said retrieving, storing the first data in a second cache page of the cache;
updating the first information of the first page descriptor for the first data to indicate that the first data is stored in the second cache page;
adding the first page descriptor to the reclamation list; and
marking the second cache page as a dirty cache page that has not been flushed to the backend non-volatile storage.

3. The computer-implemented method of claim 2, further comprising flushing the write operation recorded in the transaction log, wherein said flushing includes:
reading, from the metadata log, the first page descriptor for the first data written to the first logical address by the write operation, wherein the first data is stored at the first location on the non-volatile SSD providing storage for the extension of the transaction log;
binding the first logical address to the first location on the non-volatile SSD, wherein said binding includes updating mapping information that maps the first logical address to the first location on the non-volatile SSD; and
removing the first page descriptor from the reclamation list.

4. The computer-implemented method of claim 1, wherein said second processing to obtain a new cache page from the cache further includes:
determining that there are no free pages in the cache; and
responsive to said determining that there are no free pages in the cache, searching a clean page list for a clean page of data for eviction from the cache, wherein the clean page list includes page descriptors for pages of data which are stored in the cache and which have been flushed to the backend non-volatile storage.

5. The computer-implemented method of claim 4, wherein said second processing includes:

determining, using the clean page list, that there are no clean pages of data in the cache.

6. The computer-implemented method of claim 5, wherein said second processing includes:
responsive to determining that there are no clean pages in the cache, searching the reclamation list for a dirty cache page of data for eviction from the cache.

7. The computer-implemented method of claim 6, wherein said searching the reclamation list includes:
performing said selecting, for eviction from the cache using the reclamation list, the first data which is stored in the first cache page and which is described by the first page descriptor included in the reclamation list.

8. The computer-implemented method of claim 4, wherein a cache page of the cache marked as free does not include valid data used to service read operations.

9. The computer-implemented method of claim 4, wherein a cache page of the cache marked as clean includes valid data used to service read operations.

10. The computer-implemented method of claim 1, wherein the transaction log includes storage of a non-volatile random access memory (NVRAM).

11. The computer-implemented method of claim 10, wherein a second page descriptor is included in the metadata log for second data written by a second write operation to a second logical address, wherein the second page descriptor includes second information indicating that the second data is written to the second logical address, indicating that the second data is stored at a second location on the NVRAM providing storage for the transaction log, and indicating that the second data is loaded into a second cache page of the cache, wherein the second page of the cache is marked as dirty since the second data has not yet been flushed to the backend non-volatile storage.

12. The computer-implemented method of claim 11, wherein the second page descriptor is included in the dirty page list, and wherein the second page descriptor is not included in the reclamation list since the reclamation list does not include page descriptors associated with dirty data stored on the NVRAM providing storage for the transaction log.

13. The computer-implemented method of claim 12, further comprising flushing the second write operation recorded in the transaction log, said flushing including:
storing the second data from the second cache page to a physical storage location on the backend non-volatile storage; and
binding the second logical address to the physical storage location on the backend non-volatile storage, wherein said binding includes updating mapping information that maps the second logical address to the physical storage location on the backend non-volatile storage.

14. The computer-implemented method of claim 1, wherein the reclamation list identifies cached dirty pages of data which are candidates for eviction from the cache.

15. The computer-implemented method of claim 1, wherein each cached dirty page of data stored on a non-volatile random access memory (NVRAM) providing storage for the transaction log is not included on the reclamation list and is not a candidate for eviction from the cache, and wherein each cached page of dirty data stored in the extension of the log on at least one non-volatile SSD providing storage for the extension is included on the reclamation list and is a candidate for eviction from the cache.

16. The computer-implemented method of claim 1, wherein the reclamation list is managed using a least recently used policy so that a particular data page, which has an associated page descriptor on the reclamation list and which has an oldest or earliest access time with respect to access times of all data pages with associated page descriptors on the reclamation list, is selected for eviction from the cache prior to any other data page which has an associated descriptor on the reclamation list.

17. A system comprising:
one or more processors; and
a memory comprising code stored thereon that, when executed, performs a method comprising:
receiving a write operation that writes first data to a first logical address;
responsive to receiving the write operation, performing first processing that logs the write operation in a transaction log, the first processing including:
storing the first data at a first location on a non-volatile solid state drive (SSD) providing storage for an extension of the transaction log;
storing, in a first cache page of a cache, the first data written by the write operation;
marking the first cache page as a dirty cache page that has not been flushed to backend non-volatile storage;
storing, in a metadata log, a first page descriptor for the first data, wherein the first page descriptor includes first information indicating that the first data is written to the first logical address, indicating that the first data is stored at the first location on the non-volatile SSD providing storage for the extension of the transaction log, and indicating that the first data is loaded into the first cache page of the cache;
storing, in a dirty page list, the first page descriptor, wherein each page descriptor of the dirty page list identifies a data page that has not been flushed to the backend non-volatile storage; and
storing, in a reclamation list, the first page descriptor, wherein each page descriptor of the reclamation list identifies a data page which is stored in the cache, has not been flushed to the backend non-volatile storage, and references dirty data stored on the non-volatile SSD providing storage for the extension of the transaction log; and
performing second processing to obtain a new cache page from the cache, the second processing including:
selecting, for eviction from the cache using the reclamation list, the first data which is stored in the first cache page and which is described by the first page descriptor included in the reclamation list;
removing the first page descriptor from the reclamation list; and
allocating the first cache page as a free cache page available for reuse as the new cache page.

18. A non-transitory computer readable medium comprising code stored thereon that, when executed, performs a method comprising:
receiving a write operation that writes first data to a first logical address;
responsive to receiving the write operation, performing first processing that logs the write operation in a transaction log, the first processing including:
storing the first data at a first location on a non-volatile solid state drive (SSD) providing storage for an extension of the transaction log;
storing, in a first cache page of a cache, the first data written by the write operation;
marking the first cache page as a dirty cache page that has not been flushed to backend non-volatile storage;
storing, in a metadata log, a first page descriptor for the first data, wherein the first page descriptor includes first information indicating that the first data is written to the first logical address, indicating that the first data is stored at the first location on the non-volatile SSD providing storage for the extension of the transaction log, and indicating that the first data is loaded into the first cache page of the cache;
storing, in a dirty page list, the first page descriptor, wherein each page descriptor of the dirty page list identifies a data page that has not been flushed to the backend non-volatile storage; and
storing, in a reclamation list, the first page descriptor, wherein each page descriptor of the reclamation list identifies a data page which is stored in the cache, has not been flushed to the backend non-volatile storage, and references dirty data stored on the non-volatile SSD providing storage for the extension of the transaction log; and
performing second processing to obtain a new cache page from the cache, the second processing including:
selecting, for eviction from the cache using the reclamation list, the first data which is stored in the first cache page and which is described by the first page descriptor included in the reclamation list;
removing the first page descriptor from the reclamation list; and
allocating the first cache page as a free cache page available for reuse as the new cache page.

* * * * *